(12) United States Patent
Belt et al.

(10) Patent No.: US 10,150,165 B2
(45) Date of Patent: Dec. 11, 2018

(54) SELF-LUBRICATED DRILL BLOCK

(71) Applicant: SPIRIT AEROSYSTEMS, INC, Wichita, KS (US)

(72) Inventors: Brandon Wesley Belt, Haysville, KS (US); Phillip Viviano, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 15/403,715

(22) Filed: Jan. 11, 2017

(65) Prior Publication Data

US 2017/0197254 A1 Jul. 13, 2017

Related U.S. Application Data

(60) Provisional application No. 62/277,545, filed on Jan. 12, 2016.

(51) Int. Cl.
*B23B 49/02* (2006.01)
*B23B 47/28* (2006.01)
*F16N 7/00* (2006.01)

(52) U.S. Cl.
CPC .............. *B23B 47/28* (2013.01); *F16N 7/00* (2013.01); *B23B 2250/12* (2013.01)

(58) Field of Classification Search
CPC ..... B23B 47/28; B23B 49/02; B23B 2250/12; F16N 7/00
See application file for complete search history.

(56) References Cited

U.S. PATENT DOCUMENTS

| | | | | |
|---|---|---|---|---|
| 3,874,808 A | * | 4/1975 | Zaccardelli | B23B 47/34 408/1 R |
| 8,741,196 B2 | * | 6/2014 | McCracken | B23B 49/02 264/163 |

* cited by examiner

*Primary Examiner* — Alan Snyder
(74) *Attorney, Agent, or Firm* — Hovey Williams LLP

(57) ABSTRACT

A self-lubricated drill block comprises a housing, a reservoir, and a drill guide. The housing includes at least a top surface, a bottom surface, and a through hole extending from the top surface to the bottom surface. The reservoir is positioned within an interior of the housing and is configured to retain a lubricant. The drill guide is positioned within the through hole and is configured to receive a drill bit. The drill guide includes a cylindrical side wall which includes a lubricant opening through which the lubricant is received and supplied to the drill bit.

6 Claims, 7 Drawing Sheets

US 10,150,165 B2

SELF-LUBRICATED DRILL BLOCK

RELATED APPLICATION

The current patent application is a non-provisional application which claims priority benefit, with regard to all common subject matter, to U.S. Provisional Application No. 62/277,545, entitled "SELF-LUBRICATED DRILL BLOCK", and filed Jan. 12, 2016. The earlier-filed provisional application is hereby incorporated by reference in its entirety into the current application.

BACKGROUND OF THE INVENTION

Field of the Invention

Embodiments of the current invention relate to drill blocks used to assist in the drilling of holes.

Description of the Related Art

Drill blocks are typically formed from a block of rigid material, such as hardened rubber, plastic, polymers, or metal, that includes one or more through-holes extending from one surface through the material to an opposing surface. A drill guide, such as a bushing or sleeve, formed from material such as hardened steel, may be positioned in the hole. During usage, the drill block may be placed on an object to be drilled, such that a center of the drill guide is aligned with a target for a hole in the object. A drill bit may be placed through the drill guide to contact a surface of the object. Once the surface is contacted, the hole may be drilled.

Under normal drilling operation, friction may build up between the drill bit and the drill guide, the drill bit and the material being drilled, or a combination thereof. This may lead to undue wear of the drill bit, damage to the object being drilled, drill holes that are out of specification, or combinations thereof.

SUMMARY OF THE INVENTION

Embodiments of the current invention solve the above-mentioned problems and provide a distinct advance in the art of drill blocks. Embodiments of the current invention may provide a drill block in which a drill bit is automatically lubricated. The drill block may broadly comprise a housing, a reservoir, and a drill guide. The housing includes at least a top surface, a bottom surface, and a through hole extending from the top surface to the bottom surface. The reservoir is positioned within an interior of the housing and is configured to retain a lubricant. The drill guide is positioned within the through hole and is configured to receive a drill bit. The drill guide includes a cylindrical side wall which includes a lubricant opening through which the lubricant is received and supplied to the drill bit.

Another embodiment of the invention provides a drill block comprising a housing, a reservoir, and a drill guide. The housing is formed from an upper shell joined to a lower shell, each shell including a radial wall with a central through hole. The reservoir is positioned between the radial walls of the upper and lower shells and configured to retain a lubricant. The drill guide positioned within the through holes of the upper and lower shells and includes a cylindrical side wall. The side wall includes a lubricant opening through which the lubricant is received and supplied to the drill bit.

Yet another embodiment of the invention provides a method of drilling a hole in an object comprising the steps of adding a lubricant to a reservoir housed in a self-lubricated drill block, the reservoir configured to supply the lubricant to a drill guide configured to receive a drill bit; sealing the reservoir; positioning the self lubricated drill block on an object to be drilled; positioning the drill bit in the drill guide; and operating a drill to rotate the drill bit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
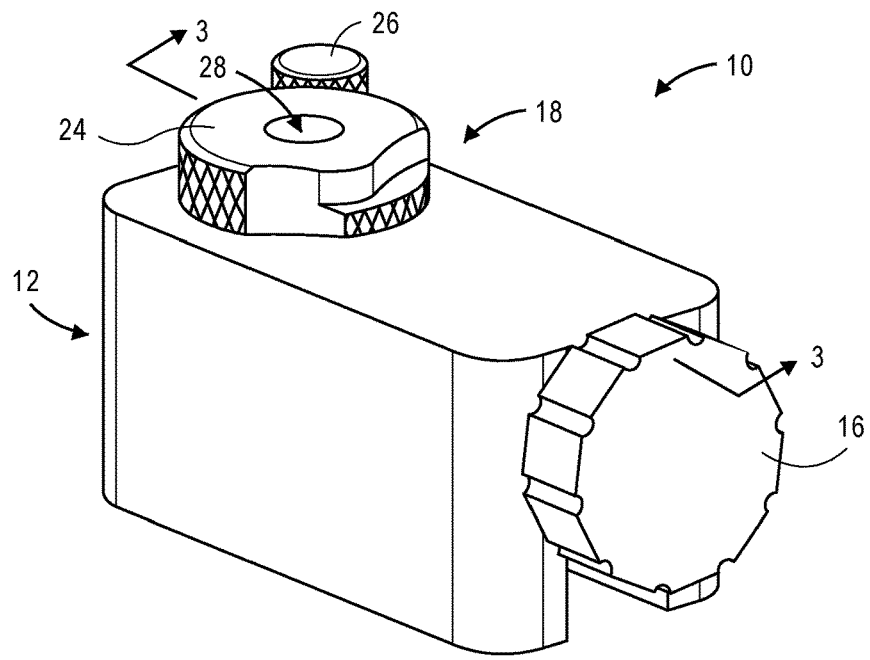
FIG. 1 is a perspective view of a self-lubricated drill block, constructed in accordance with various embodiments of the current invention, the drill block comprising a housing, a reservoir, and a drill guide.
Figure 2:
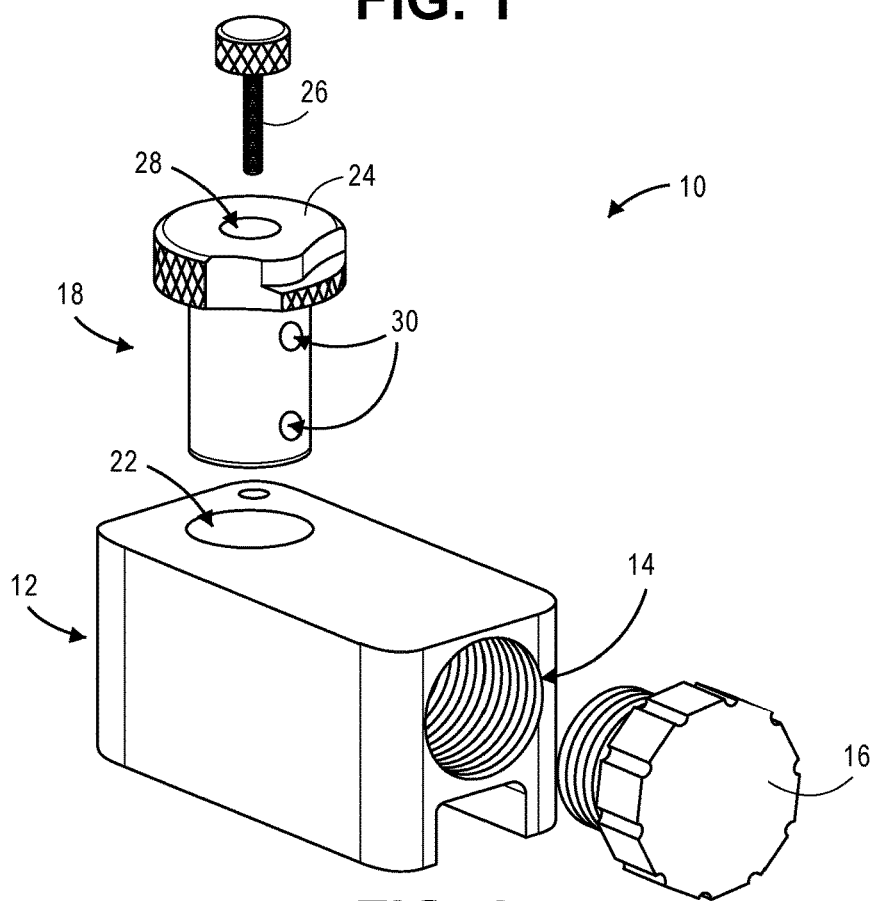
FIG. 2 is an exploded view of the self-lubricated drill block of FIG. 1.
Figure 3:
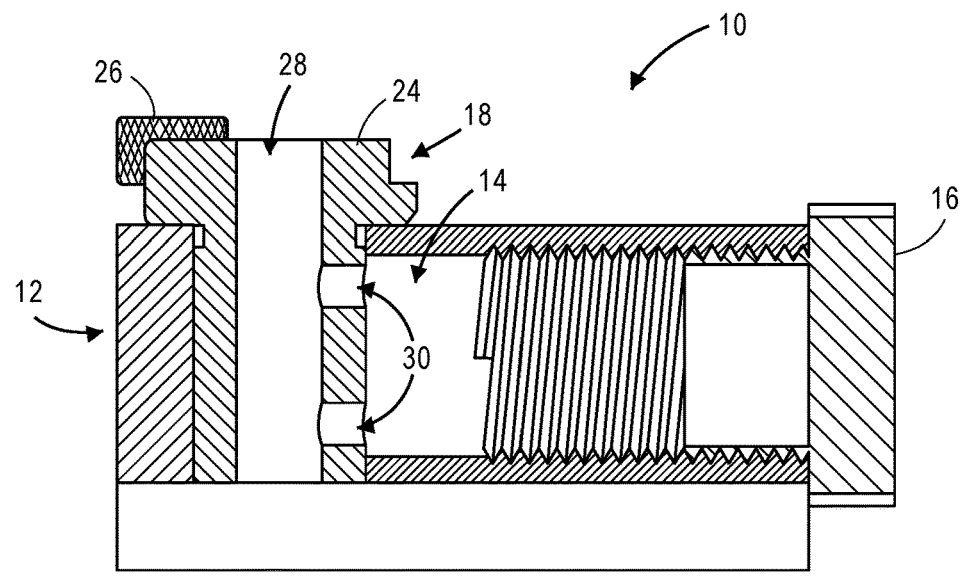
FIG. 3 is a sectional view of the self-lubricated drill block cut along the 3-3 from FIG. 1.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The terms "top", "bottom", "side", "end", etc. used throughout this document do not describe absolute orientations or positions, but instead are relative and describe the relationship of one component or element relative to another.

A self-lubricated drill block 10, constructed in accordance with various embodiments of the current invention, is shown in FIGS. 1-7. The drill block 10 may broadly comprise a housing 12, a reservoir 14, a cap 16, a drill guide 18, and an optional lubricant channel 20. The drill block 10 may retain a lubricant that is provided to a drill bit used to drill a hole in an object. The lubricant may include oils, gels, or combinations or variations thereof which reduce the friction between the drill bit and the drill block 10.

Figure 4:
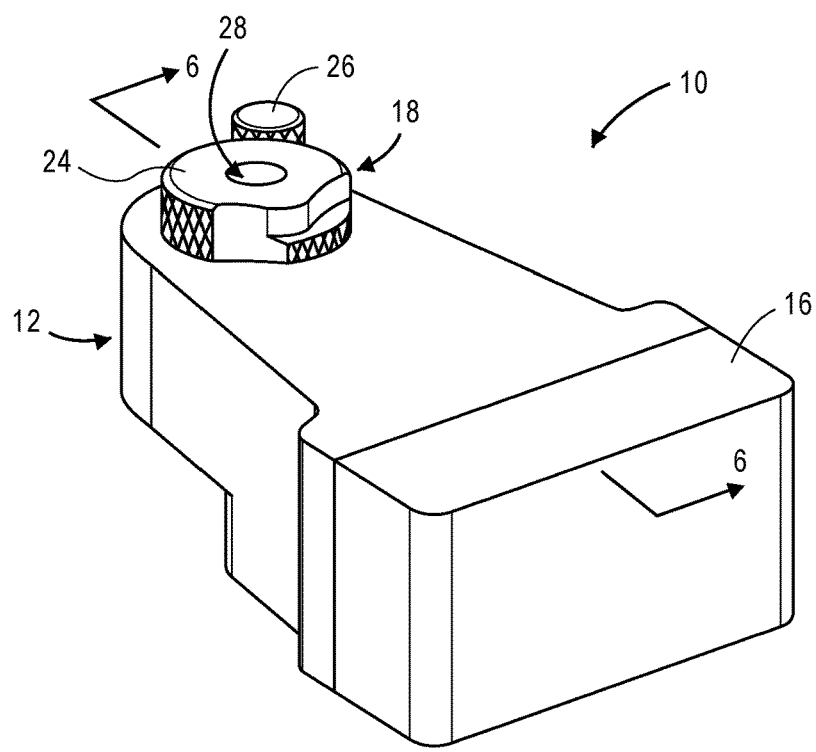
FIG. 4 is a perspective view of another embodiment of the self-lubricated drill block.
Figure 5:
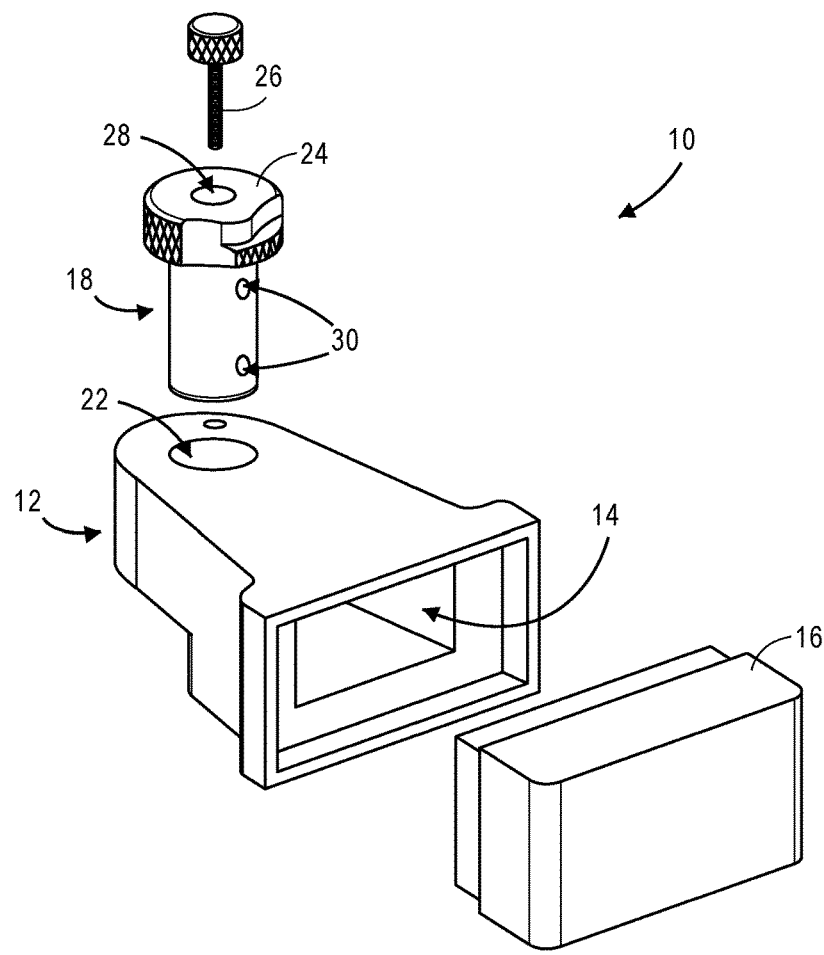
FIG. 5 is an exploded view of the self-lubricated drill block of FIG. 4.
Figure 6:
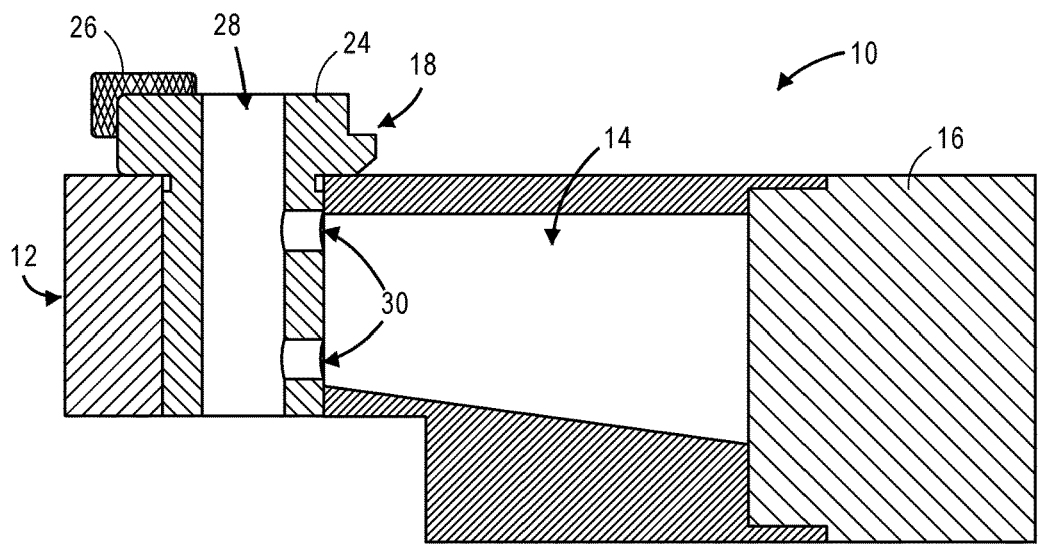
FIG. 6 is a sectional view of the self-lubricated drill block cut along the 6-6 from FIG. 4.

The housing 12 may be formed from materials such as hardened rubber, plastic, polymers, or metal, and may have a rectangular box shape with top and bottom surfaces, first and second side surfaces, and first and second end surfaces. Typically, all of the surfaces are planar, although any of the surfaces may have a curvature or may be tapered or angled. For example, FIGS. 1-3 and 7 depict rectangular box housings 12, while FIGS. 4-6 depict an offset housing 12. In various embodiments, the corners between the side surfaces and the end surfaces may be rounded. In some embodiments, one or more alignment channels or grooves may be formed in one or more of the surfaces—typically on the bottom surface. The channel may have a cross section with a semicircular or arcuate shape, a triangular shape, a square or rectangle shape, and so forth. Alternatively, the housing 12 may include a tongue or tab that protrudes from one or more of the surfaces. In addition, in some embodiments, the bottom surface may include feet or other features to prevent slippage of the drill block 10 on a surface of an object to be drilled. Furthermore, the housing 12 may include a through hole 22 of generally cylindrical shape which extends from the top surface of the housing 12 to the bottom surface. In some embodiments, the through hole 22 may include threads along the surface thereof. The housing 12 may also include additional openings and/or holes to provide access to the reservoir 14 or to accommodate fasteners, such as screws.

The reservoir 14 may retain the lubricant to be provided to the drill bit. The reservoir 14 may be a cavity positioned within the interior of the housing 12. The reservoir 14 may have any one of a variety of shapes, such as rectangular box, cubic, spherical, cylindrical, or the like. The reservoir 14 may couple to one or more surface openings in the housing 12. In various embodiments, the reservoir 14 may also couple to the through hole 22, such that there is an opening in the through hole 22 which connects to the reservoir 14. In embodiments that include the lubricant channel 20, the reservoir 14 may couple to the lubricant channel 20.

The cap 16 may cover the reservoir 14 to prevent leakage, spillage, or contamination of the lubricant within the reservoir 14. In some embodiments, the cap 16 may include a head along with a threaded portion which may be coupled to an opening in the top surface, one of the side surfaces, or one of the end surfaces of the housing 12. In other embodiments, the cap 16 may include a flat plate or a block which covers the reservoir 14 through an opening in the housing 12 and is coupled to the housing 12 with a fastener, such as a screw. The cap 16 may further include gaskets or other seals positioned on a surface which contacts the housing 12.

The drill guide 18 may be received within the through hole 22 and may be formed from materials such as hardened steel. In exemplary embodiments, the drill guide 18 may include a slip fit bushing of generally cylindrical shape with a circumferential side wall having an inner diameter and an outer diameter. The drill guide 18 may further include a head 24 at one end of the bushing, wherein the head has a greater outer diameter than the outer diameter of the side wall. The head 24 may include a hole which accepts a lock screw 26. The housing 12 may also include a hole on the top surface in the vicinity of the through hole 22 which also accepts the lock screw 26 to fasten the head 24 to the housing 12. In some embodiments, the drill guide 18 may include threads on an outer surface of the side wall. The drill guide 18 may also include a drill bit opening 28 which extends the axial length of the drill guide 18 through which a drill bit is placed. The drill guide 18 may further include at least one lubricant opening 30 extending from an outer surface of the side wall radially to the drill bit opening 28.

Figure 7:
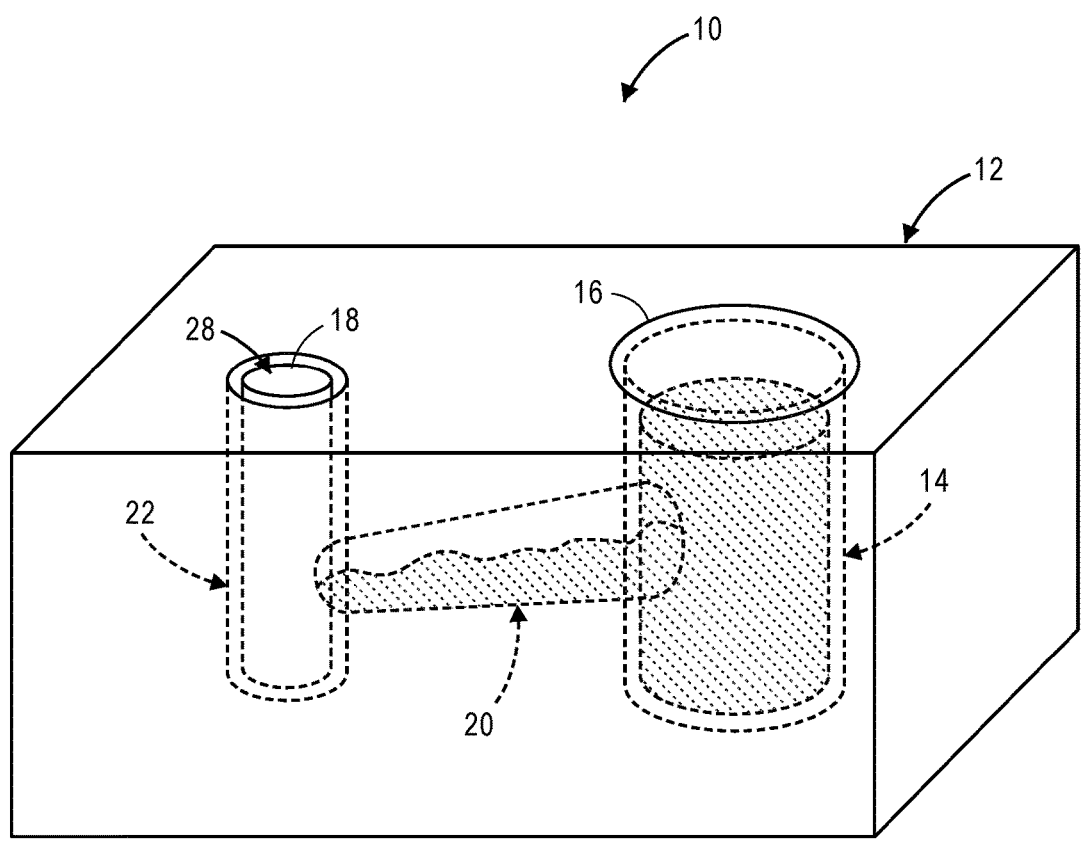
FIG. 7 is a perspective view of yet another embodiment of the self-lubricated drill block.

The channel 20, as seen in FIG. 7, may supply lubricant from the reservoir 14 to the drill guide 18. In some embodiments, the channel 20 may have a generally hollow cylindrical shape which may couple to the reservoir 14 at a first end and to the lubricant opening 30 at an opposing second end. In other embodiments, the channel 20 may have a generally hollow frusto-conical shape with a diameter that tapers from the first end to the second end. In embodiments in which the reservoir 14 couples to the through hole 22, the channel 20 may not be included in the drill block 10.

The drill block 10 may be utilized as follows. The drill guide 18 may be positioned within the through hole 22. If the drill guide 18 includes a slip fit bushing, then the drill guide 18 may be inserted in the through hole 22 and the head 24 may be rotated until the lock screw opening aligns with a hole in the housing 12. The lock screw 26 may then be screwed in place to couple the head to the housing 12. If the drill guide 18 includes a threaded side wall, then the drill guide 18 may be threadably coupled to, or screwed into, the through hole 22. The cap 16 may be removed and the reservoir 14 may be filled with the lubricant. The cap 16 may be replaced and secured to the housing 12. The drill block 10 may then be positioned on the object to be drilled. If the drill block 10 includes an alignment channel or a tongue, then the drill block 10 may be placed on the object so that the channel or tongue is aligned to the corresponding alignment feature on the object. In addition, the drill block 10 may be positioned such that a center of the drill guide 18 is aligned with a target for the hole to be drilled.

The drill bit may be placed within the drill bit opening 28. A drill controlling the drill bit may be activated to rotate the drill bit. As the drill bit rotates, a vacuum may be created within the drill guide 18, which may, in turn, pull lubricant through the lubricant opening 30 from the reservoir 14—thereby lubricating the drill bit as it operates. Continued operation of the drill bit may also continue to pull lubrication into the drill guide 18 and lubricate the drill bit, thus reducing friction therebetween. After the hole is drilled, the drill bit may be removed from the drill guide 18. At any time, should the drill guide 18 become clogged with burrs, the drill bit may be removed from the drill bit opening 28, and the drill block 10 may be struck or tapped lightly to dislodge and expel the burrs.

Figure 8:
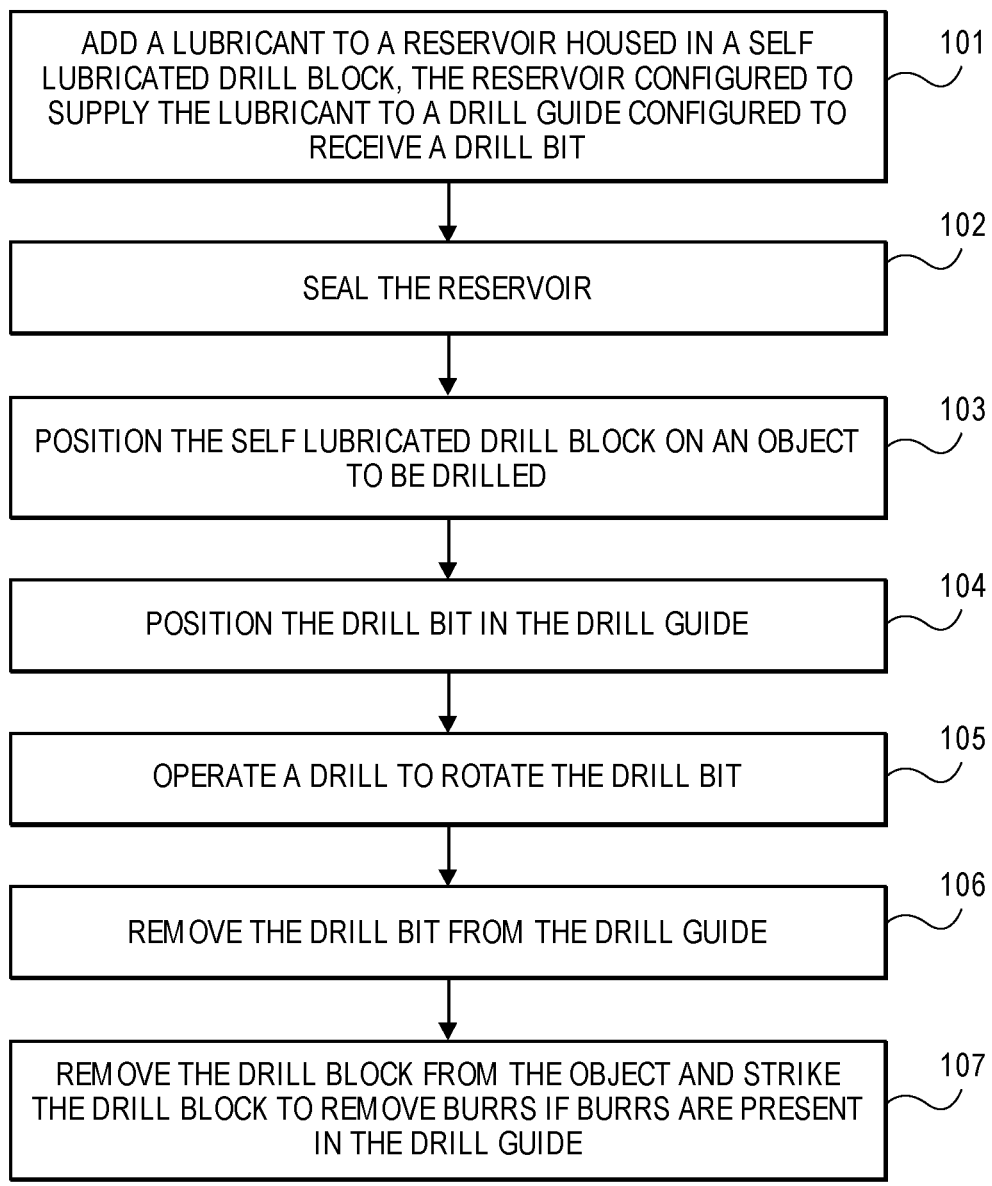
FIG. 8 is a flow diagram of at least a portion of the steps of a method of drill a hole in an object.

FIG. 8 depicts a listing of at least a portion of the steps of an exemplary method 100 of drilling a hole in an object. The steps may be performed in the order shown in FIG. 8, or they may be performed in a different order. Furthermore, some steps may be performed concurrently as opposed to sequentially. In addition, some steps may be optional.

Referring to step 101, a lubricant is added to a reservoir 14 housed in a self-lubricated drill block 10. The lubricant may include oils, gels, or combinations or variations thereof which reduce the friction between a drill bit and the drill block 10. The drill block 10 may include a housing 12 with a through hole 22 which retains a drill guide 18. The reservoir 14 is positioned within the housing 12 and may be configured to supply the lubricant to the drill guide 18. The drill guide 18 may include a circumferential side wall with a lubricant opening 30 configured to receive the lubricant and a drill bit opening 28 configured to receive the drill bit controlled by a drill.

Referring to step 102, the reservoir 14 is sealed. The drill block 10 may further include a cap 16 which covers the reservoir 14.

Referring to step 103, the drill block 10 is positioned on an object to be drilled. If the drill block 10 includes an alignment channel or a tongue, then the drill block 10 may be placed on the object so that the channel or tongue is aligned to the corresponding alignment feature on the object. In addition, the drill block 10 may be positioned such that a center of the drill guide 18 is aligned with a target for the hole to be drilled.

Referring to step 104, the drill bit is positioned in the drill guide 18.

Referring to step 105, the drill is operated to rotate the drill bit. As the drill bit rotates, a vacuum may be created within the drill guide 18, which may, in turn, pull lubricant through the lubricant opening 30 from the reservoir 14—thereby lubricating the drill bit as it operates. Continued operation of the drill bit may also continue to pull lubrication into the drill guide 18 and lubricate the drill bit, thus reducing friction therebetween.

Referring to step 106, the drill bit is removed from the drill guide 18.

Referring to step 107, the drill block is removed from the object and is struck or tapped lightly if there are burrs present in the drill guide 18.

Figure 9:
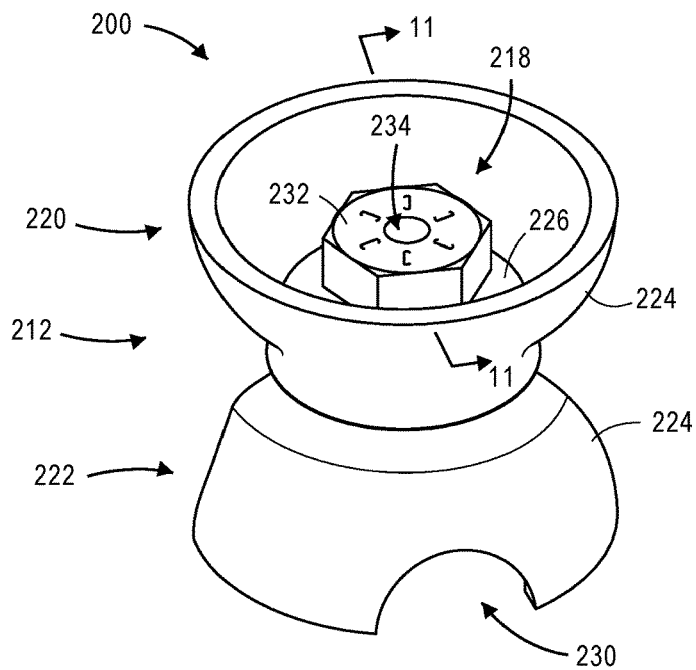
FIG. 9 is a perspective view of still another embodiment of the self-lubricated drill block.
Figure 10:
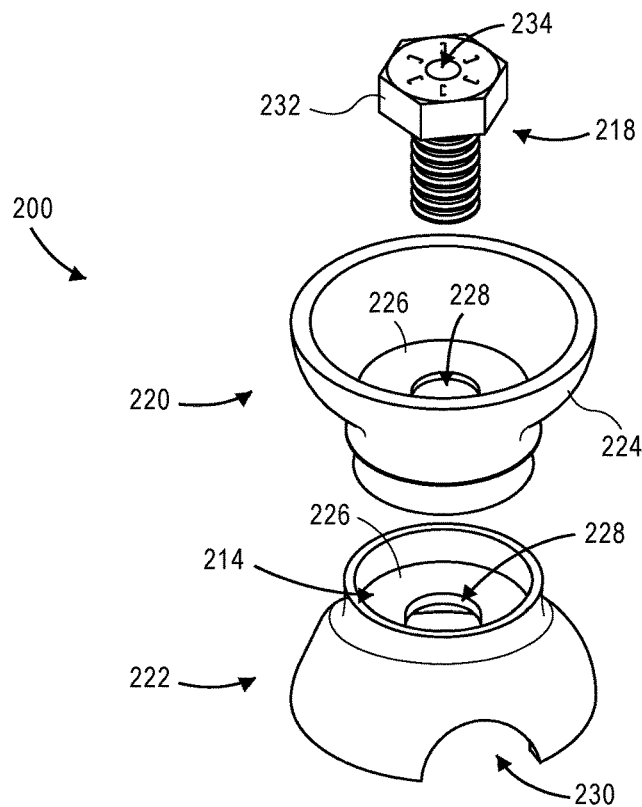
FIG. 10 is an exploded view of the self-lubricated drill block of FIG. 9.
Figure 11:
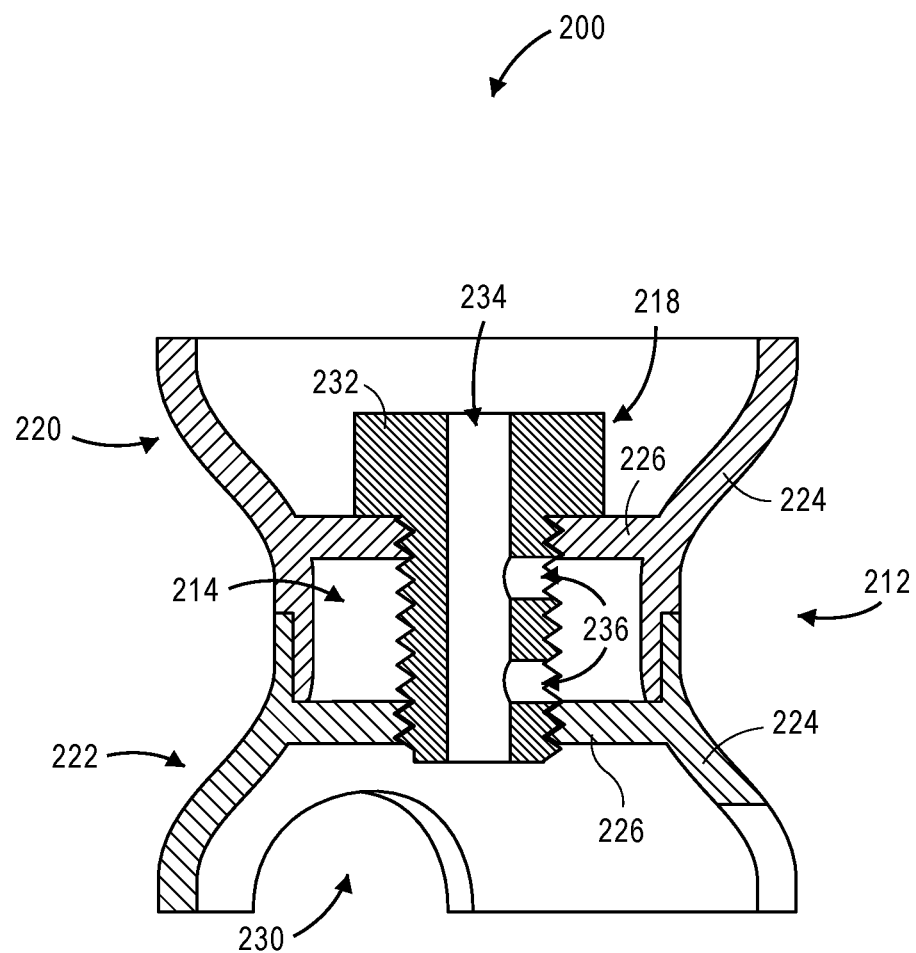
FIG. 11 is a sectional view of the self-lubricated drill block cut along the 11-11 from FIG. 9.

Another embodiment of a self-lubricated drill block 200 is shown in FIGS. 9-11. The drill block 200 may broadly comprise a housing 212, a reservoir 214, and a drill guide 218. The drill block 200 may retain a lubricant that is provided to a drill bit used to drill a hole in an object with alignment features along a curved path.

The housing 212 may be formed from materials such as hardened rubber, plastic, polymers, or metal, and may include an upper shell 220 and a lower shell 222. Each shell 220, 222 may include a circumferential wall 224 and a radial wall 226. The circumferential wall 224 may have a first opening at a first end and a second opening at a second end, wherein the first opening has a smaller diameter than the second opening and the circumferential wall 224 flares radially outward from the first opening to the second opening. In addition, the circumferential wall 224 has an inner surface and an outer surface. The radial wall 226 may be generally disc shaped with a central through hole 228 and may be positioned on the interior of the circumferential wall 224, contacting the inner surface thereof at a distance away from the first opening. In some embodiments, the through hole 228 in the radial wall 226 may be threaded. In various embodiments, the circumferential wall 224 of the lower shell 222 may include three notches 230 equally distributed along the circumference at the second opening. In other embodiments, there may be greater or fewer notches 230. Each notch 230 may have a generally arcuate shape, although other shapes, such as square, rectangular, triangular, etc., are possible.

The housing 212 may have the following construction. The first opening of the upper shell 220 may be joined with the first opening of the lower shell 222 such that a portion of the circumferential wall 224 of the upper shell 220 is positioned within a portion of the circumferential wall 224 of the lower shell 222. A portion of the outer surface of the circumferential wall 224 of the upper shell 220 may contact a portion of the inner surface of the circumferential wall 224 of the lower shell 222.

The reservoir 214 may retain the lubricant to be provided to the drill bit. The reservoir 214 may be a cavity positioned within the interior of the housing 212 and may be formed by a first surface of the radial wall 226 of the upper shell 220, a first surface of the radial wall 226 of the lower shell 222, and a portion of the inner surface of the circumferential wall 224 of the upper shell 220. There may be a hole in the radial wall 226 of the upper shell 220 or the lower shell 222 or in one or both of the circumferential walls 224 through which the lubricant may be added to the reservoir 214. The drill block 200 may also include a cap to cover the hole.

The drill guide 218 may be received within the through holes 228 of the upper and lower shells 220, 222 and may be formed from materials such as hardened steel. In exemplary embodiments, the drill guide 218 may include a slip fit bushing of generally cylindrical shape with a circumferential side wall having an inner diameter and an outer diameter. The drill guide 218 may further include a head 232 at one end of the bushing, wherein the head has a greater outer diameter than the outer diameter of the side wall. In some embodiments, the head 232 may include a hole which accepts a lock screw. The housing 212 may also include a hole in the radial wall 226 of the upper shell 220 which also accepts the lock screw. In some embodiments, the drill guide 218 may include threads on an outer surface of the side wall. The drill guide 218 may also include a drill bit opening 234 which extends the axial length of the drill guide 218 through which a drill bit is placed. The drill guide 218 may further include at least one lubricant opening 236 extending from an outer surface of the side wall radially to the drill bit opening 234. When the drill guide 218 is positioned within the through holes 228 of the upper and lower shells 220, 222, the reservoir 214 may surround a portion of the drill guide 218 and contact a portion of the outer surface thereof.

The drill block 200 may be utilized in substantially the same fashion as the drill block 10 discussed above.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A self-lubricated drill block comprising:
  a housing including at least a top surface, a bottom surface, and a through hole extending from the top surface to the bottom surface;

a reservoir located and sealed within the housing and configured to retain a lubricant; and a drill guide configured to receive a drill bit, the drill guide positioned within the through hole and including a side wall, the side wall including a lubricant opening through which the lubricant is received and supplied to an intermediate portion of the drill bit within the drill guide.

2. The self-lubricated drill block of claim 1, further comprising a cap configured to couple to the housing and seal the reservoir.

3. The self-lubricated drill block of claim 1, wherein the drill guide includes a bushing with a head of greater diameter than a diameter of the side wall and the self-lubricated drill block further comprises a lock screw configured to fasten the head to the housing.

4. The self-lubricated drill block of claim 1, wherein the lubricant opening includes a hole that extends radially through the side wall.

5. The self-lubricated drill block of claim 1, wherein the drill guide is threaded on an outer surface and a surface of the through hole is threaded so that the drill guide is threadably coupled to the through hole.

6. The self-lubricated drill block of claim 1, further comprising a lubricant channel coupling to the reservoir at a first end and to the lubricant opening at an opposing second end, the lubricant channel configured to supply the lubricant to the lubricant opening from the reservoir.

\* \* \* \* \*